United States Patent [19]

Bouyoucos

[11] Patent Number: 4,632,214
[45] Date of Patent: Dec. 30, 1986

[54] SEISMIC SOURCE FOR USE UNDERWATER

[75] Inventor: John V. Bouyoucos, Rochester, N.Y.

[73] Assignee: Hydroacoustics, Rochester, N.Y.

[21] Appl. No.: 129,871

[22] Filed: Mar. 13, 1980

[51] Int. Cl.⁴ .......................... G01V 1/137; G01V 1/38
[52] U.S. Cl. ..................................... 181/120; 367/146; 181/110; 181/115
[58] Field of Search ................ 367/146; 181/106, 110, 181/115, 120

[56] References Cited

U.S. PATENT DOCUMENTS

| | | | |
|---|---|---|---|
| 3,638,752 | 2/1972 | Wakefield | 181/115 |
| 3,979,140 | 9/1976 | Silverman et al. | 181/106 |
| 4,049,078 | 9/1977 | Paitson | 181/120 |
| 4,131,178 | 12/1978 | Bouyoucos | 181/120 |
| 4,180,139 | 12/1979 | Walker | 181/120 |
| 4,185,714 | 1/1980 | Pascouet et al. | 181/120 |
| 4,196,788 | 4/1980 | Sciard | 181/119 |
| 4,234,052 | 11/1980 | Chelminski | 181/120 |

FOREIGN PATENT DOCUMENTS

| | | | |
|---|---|---|---|
| 41891 | 12/1976 | Australia | 181/120 |
| 2308112 | 11/1976 | France | 181/120 |

OTHER PUBLICATIONS

Renard et al., "Simplon Water Gun, A New Implosion Type Seismic Source", 5/74, 5 pages, otc2017.

Primary Examiner—Nelson Moskowitz
Attorney, Agent, or Firm—Martin LuKacher

[57] ABSTRACT

A seismic source drives one or more jets of high velocity water into an underwater environment and then terminates the jets by means of a valve member, the motion of which is controlled to obtain precisely timed high energy seismic pulses to provide reflected signals from which high resolution seismograms may be obtained when the signals are processed.

14 Claims, 5 Drawing Figures

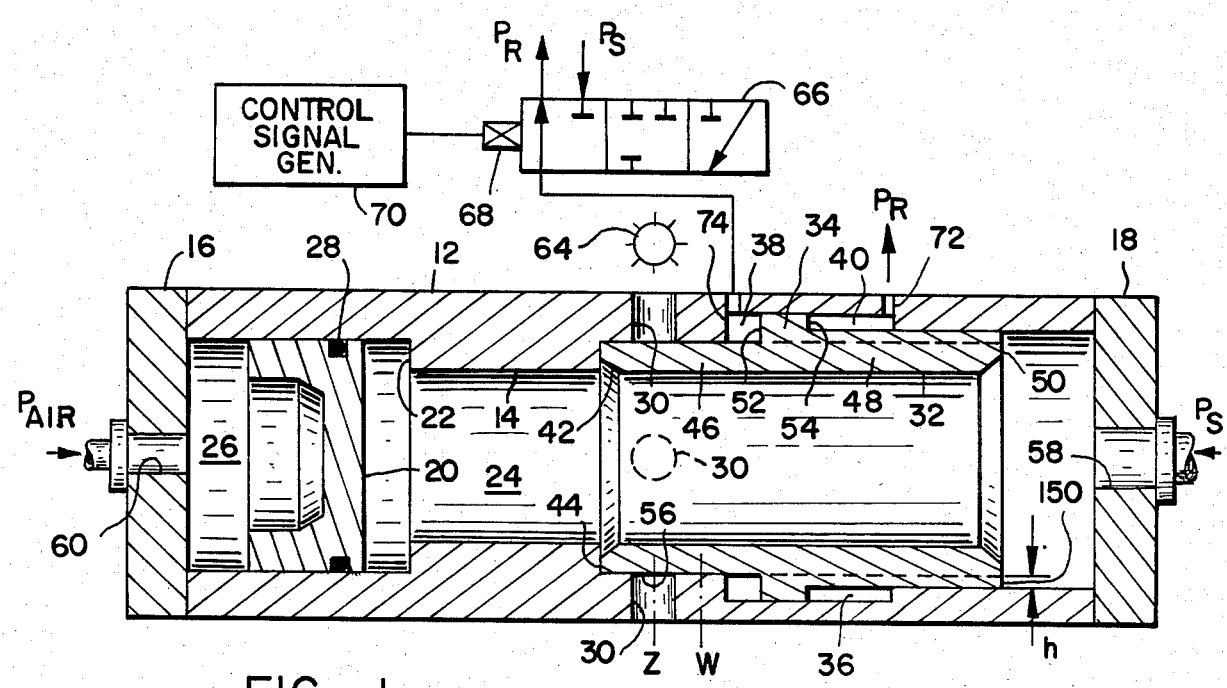
FIG_1
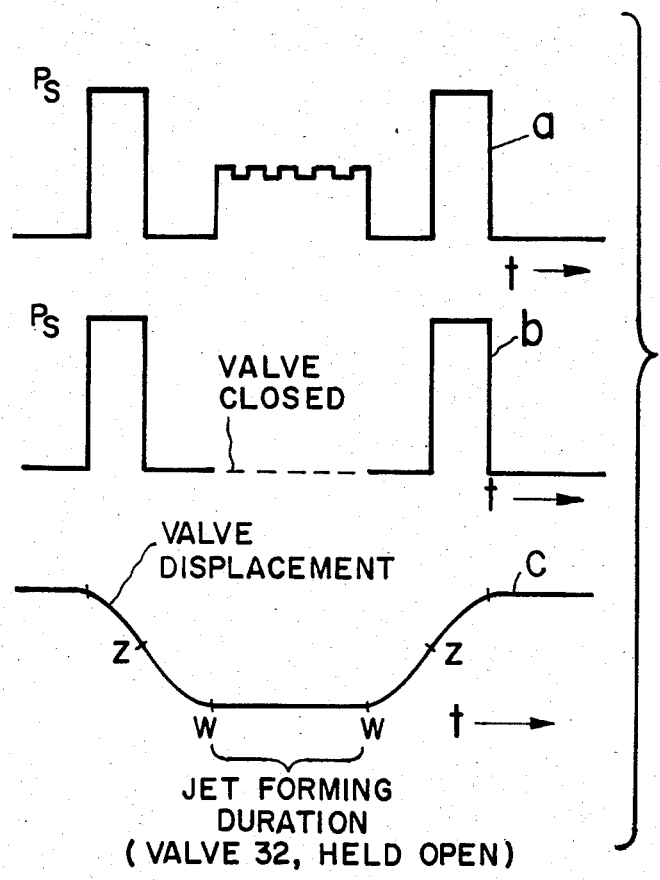
FIG_3

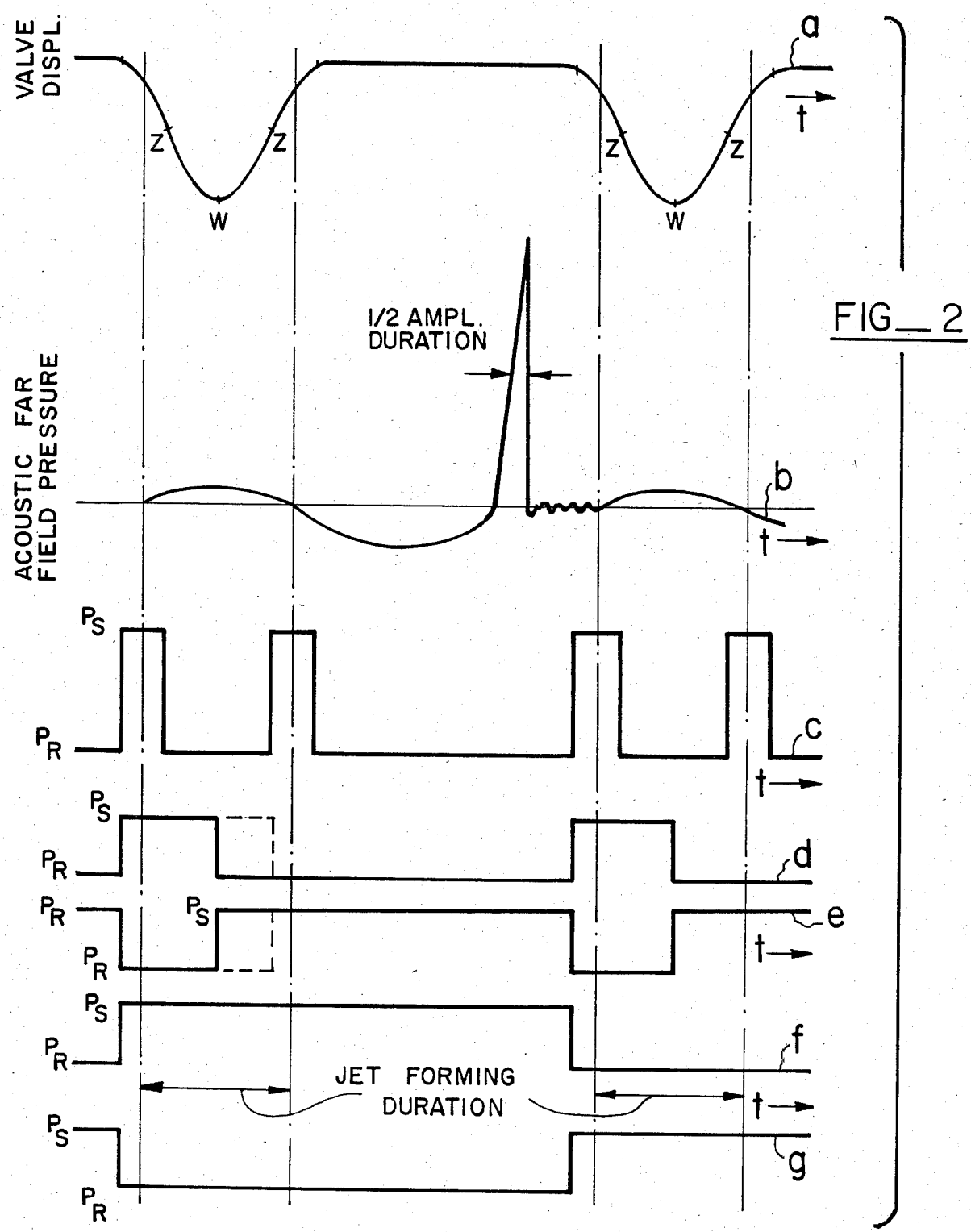

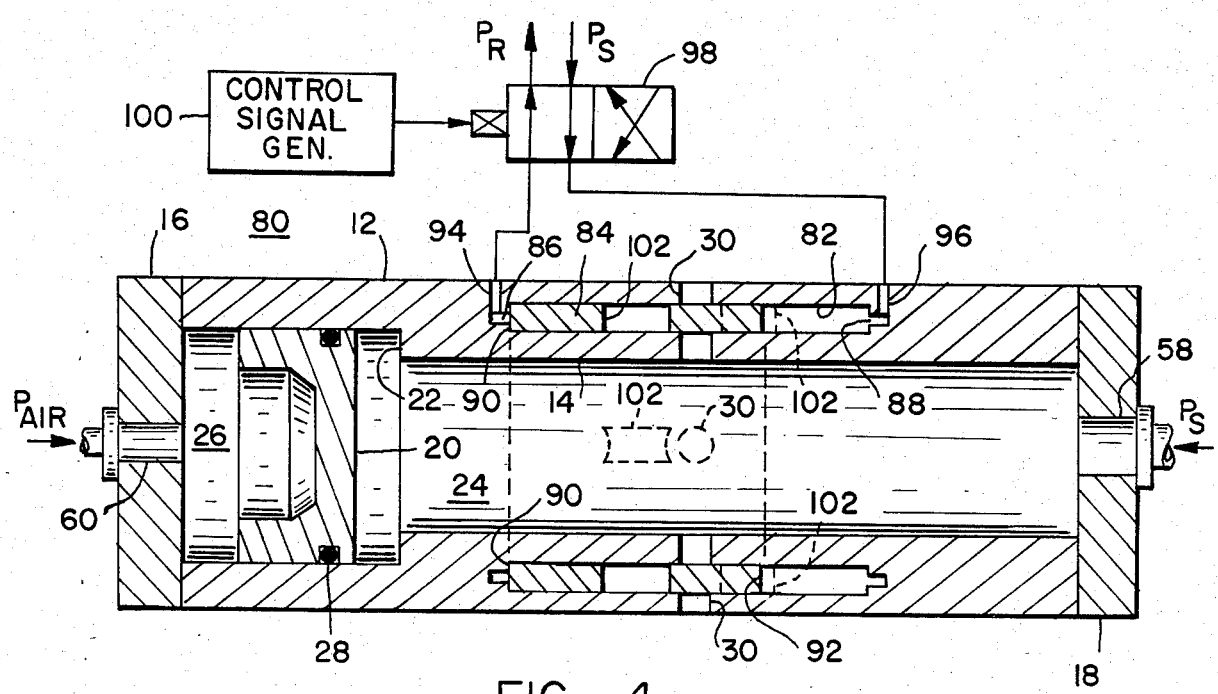
FIG_4
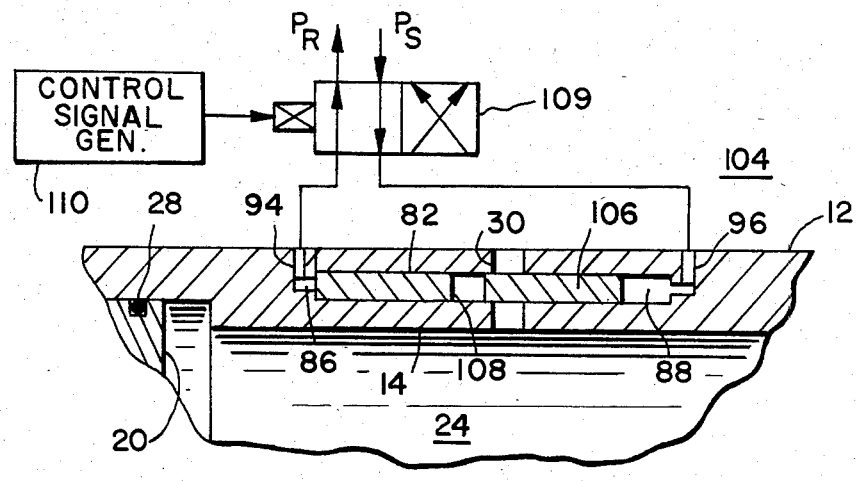
FIG_5

SEISMIC SOURCE FOR USE UNDERWATER

DESCRIPTION

The present invention relates to seismic sources and particularly to seismic sources of the type which generate seismic signals by means of the collapse of vapor cavities formed when a free jet column of water is launched into an underwater environment.

The invention is especially suitable for use in providing an improved seismic source of the so-called "water-gun" type. Features of the invention may be found useful wherever acoustic signals resulting from an implosive event, underwater, are desired.

Generation of seismic signals underwater has been accomplished in the past by air guns which eject high pressure air into the water abruptly to produce a positive pressure excursion, as by an explosive event. Such explosive-like events are normally rich in low frequency energy. Signals for effective seismic exploration must not only have low frequency energy content, but also bandwidth (i.e., high frequency energy as well), to achieve both the penetration and resolution desired for geophysical exploration.

In order for the seismic pulse from the air gun to have high frequencies in its spectral content, the release of the compressed air must occur over a very short period. The energy that is released into the pulse is proportional to the pressure of the compressed air, the area of the ports (apertures) and the time-duration the ports open. Thus, to achieve a high energy signal with broadband frequency content, a high pressure gun must be used which can achieve a large aperture opening for a short interval of time.

Various valving mechanisms have been used in air guns to provide for the release of short bursts of compressed air from a firing chamber, and may take the form of shuttling sleeve valves as described in the disclosure of U.S. Pat. No. 4,180,139 issued Dec. 25, 1979.

In the water gun type of seismic source, energy is initially stored as by the compression of gas under the force due to pressurized water. Upon the opening of one or more ports, this stored potential energy is converted into kinetic energy of free water jet columns which, upon termination of the jets by closure of the ports, create vapor cavities. These cavities grow to a maximum size, which size is a function of the total kinetic energy in the jets. The cavities then collapse due to the inward force on the cavity-water interface. This inward force is proportional to the difference between the ambient water pressure head in the vicinity of the water gun and the vapor pressure inside the cavity. The potential energy of the cavities, represented by their largest size, is converted to the kinetic energy of imploding flows which, in turn, create positive pressure signals in the water as the cavities are extinguished.

Generally, it is preferred that at least two jets are formed in opposite directions to minimize net momentum transfer to the gun body. Although the cavities that are so formed by these jets may be extinguished at slightly different times, such time separations are generally sufficiently small so that the individual pulses are not resolvable within normal seismic exploration bandwidths.

The vapor-filled cavities do not significantly impede the implosion process. The internal water vapor tends to condense at the cavity interface wall as the collapse proceeds, thereby enabling the internal pressure to remain at the local vapor pressure. Thus, there is no cushion to the collapse and the resulting acoustic pressure signature is rich in high frequency energy. On the other hand, the low frequency energy content of the water gun signature depends upon the time duration from the termination of the jets to the implosion events. This time duration depends upon the total kinetic energy contained in the jets and the subsequent size of the cavities formed. This time duration depends also upon the ambient pressure head or upon the depth at which the gun is placed, as this pressure governs the maximum cavity size for a given kinetic energy input as well as the acceleration of the cavity-water interface. Thus, to achieve a water gun signature that is rich in low frequency energy requires that the individual jets contain large kinetic energy. Thus, for a given total kinetic energy, it is best to minimize the number of jets to obtain the greatest energy in each. As noted above, two jets are generally the practical minimum if the gun body is not to be unduly accelerated. To maximize the total kinetic energy, thereby to achieve adequate low frequency spectral energy, the operating pressure of the gun must be high and the ports opened for relatively long time. In fact, it has been found that the ports should generally be open for a time which is long compared with the time duration of the main positive pulse emitted by the gun.

Thus, the water gun and the air gun are almost mirror images in their desired characteristics, as relates to the generation of broadband spectral energy suitable for seismic exploration. Whereas, the air gun ports must be open only for a short time to achieve adequate high frequency energy, the water gun ports must be open for a relatively longer time to obtain adequate low frequency energy. For given practical valve velocities, air gun ports must have dimensions small in the direction of valve motion to achieve short-open times. As a result, a multiplicity of ports is usually desired to achieve sufficient total port area, enabling the desired energy to be transmitted to the water. On the other hand, it has been found that water gun ports are preferably few in number and large in size, particularly in the direction of valve travel, to enable the long open times associated with the release of the desired energy. Valve velocities must still be comparable to those of air guns to enable the abrupt termination of the jets, thereby achieving efficient vapor cavity formation. High valve velocites are also important to the precise timing of a gun signature, so that a number of guns can be synchronized in an array.

U.S. Pat. No. 4,131,178 issued Dec. 26, 1978 to John V. Bouyoucos describes a seismic source of the water gun type. Other water gun sources are described in some of the references cited in that Bouyoucos patent, particularly French Pat. No. 2308112 published Dec. 11, 1976, and in an article by Renard et al, Sixth Annual Offshore Technology Conference, Paper OTC 2017, May 1974.

The improvements of this invention provide for water guns possessing broadband acoustic energy output, suitable for seismic exploration, which output is rich in low frequency energy, by enabling long open port times while achieving rapid or abrupt port closure essential to efficient vapor cavity formation, and for synchronization of guns for array and other precise timing applications. It is also a desired improvement that such water guns can be rapid acting such that the pulses or shots may be produced without long delays, thereby enabling increased rates of survey advance.

Accordingly it is an object of the invention to provide improved seismic sources for use underwater.

A further object of the invention is to provide improved seismic sources of the water gun type.

A still further object of the invention is to provide an improved water gun seismic source which is capable of producing shots repeatedly without long intervening delays.

A still further object of the invention is to provide an improved water gun seismic source capable of producing shots with precise timing such that coherent summation of signals from an array of sources may be achieved to increase the seismic energy injected into the water.

A still further object of the invention is to provide an improved water gun seismic signal source which transmits strong signals with optimal efficiency of energy conversion from hydraulic energy into acoustic energy in the water.

Briefly described, a source of seismic pulse signals in accordance with the invention injects a free liquid column into an underwater environment in order to generate a vapor cavity, the collapse of which produces the seismic pulse. The source has a housing with an internal chamber having means for storing energy due to the force of pressurized liquid therein. A jet forming aperture in the housing extends into the chamber; it is through this aperture that pressurized liquid can be released to form the free liquid columns. A valve member is disposed in porting relationship with the jet aperture. The valve is actuated to open the aperture to initiate the liquid column and to close the aperture to terminate the column. The control system for the valve actuation maintains the aperture open for a time duration which is long compared to the duration of the seismic pulse at half maximum amplitude thereof. The pulse is precisely timed in accordance with control signals and may be cycled to provide pulses with short intervening delays.

The foregoing and other object features and advantages of the invention as well as presently preferred embodiments thereof will become more apparent from a reading of the following description in connection with the accompanying drawings in which:

FIG. 1 is a sectional view showing a seismic source in accordance with an embodiment of the invention together with a schematic illustration of the control means thereof;

FIG. 2 is a series of wave forms illustrating the displacement and pressure resulting from the operation of the embodiments of the invention illustrated in FIGS. 1, 4, and 5, FIGS. 2a and 2c relating specifically to FIG. 1, FIGS. 2d and 2c relating specifically to FIG. 5 and FIGS. 2f and 2g relating specifically to FIG. 4;

FIG. 3 is a series of wave forms which illustrates valve displacements and corresponding valve actuating pressures which may be obtained for controlling duration during which the valve is positioned to open the jet apertures of the source shown in FIG. 1;

FIG. 4 is a sectional view of another seismic source and its associated control means in accordance with another embodiment of the invention; and FIG. 5 is a fragmentary sectional view illustrating the valve structure of a seismic source similar in many respects to the source of FIG. 4 and which is provided in accordance with another embodiment of the invention;

Referring first to FIG. 1, a water gun seismic source 10 in accordance with a presently preferred embodiment of the invention has a cylindrical housing 12 with a bore 14 which forms a cylinder. The cylinder is closed by end caps 16 and 18.

A piston 20 is slideably disposed in the cylinder 14 above a step 22 which acts as a stop and limits the displacement of the piston 20 in a forward direction along the axis of the cylinder. The forward direction is to the right and the rearward direction is to the left in FIG. 1. The piston 20 divides the cylinder into a first chamber 24 and a second chamber 26 on the forward and rearward sides thereof, respectively. A suitable seal such as an O-ring 28, seals the first chamber 24 from the second chamber 26. The rearward end of the piston 20 has a large blind opening for purposes of lightening the weight of the piston 20 and increasing the volume of the second chamber 26. The stop 22 limits the movement of the piston into the first chamber 24 so that it cannot reach the vicinity of jet forming apertures 30 which extend through the housing 12 into the first chamber 24. Although a single aperture 30 will suffice, it is preferable to have at least two opposed apertures with their axes in the same plane perpendicular to the axis of the cylindrical housing 12. Two pairs of such jet apertures 30 are provided in the embodiment of the invention shown in FIG. 1. The apertures are shown as being circular. They may, however, be rectilinear or other shapes.

The flow of the pressurized fluid through the apertures is initiated and terminated by a sleeve valve member 32. The sleeve valve is slideably disposed in the first chamber 24 of the cylinder and is cylindrical in shape. A ring 34 extends radially outward from the sleeve valve into a cavity 36 in the housing 12 and divides that cavity into first and second control or actuating chambers 38 and 40. A step 42 in the cylinder 14 limits the movement of the sleeve valve 32 in the rearward direction axially of the cylinder when the rearward end 44 of the valve 32 is in engagement with the step 42 as shown in FIG. 1. The forward section 48 of the valve on the right side of the ring 34 is of larger diameter than the rearward section 46 of the valve, which is on the left side of the ring 34. The forward end 50 of the valve presents a surface area in a plane perpendicular to the axis of the cylindrical housing 12 which is larger than the area presented by the rearward end 42 also in a plane perpendicular to the axis of the housing 12.

The rear end surface 52 of the ring 34 is a pressure actuating surface which defines in part the first actuating or control chamber 38. The forward end surface 54 of the ring 34 is opposed to the surface 52 and is also a pressure actuating surface which defines in part the actuating or control chamber 40. Another effective pressure actuating surface on the valve is the differential area defined by the difference between the projected areas of forward end 50 and rearward end 44 of the valve 32. This differential area is denoted as 150 in FIG. 1 and is the portion of the end 50 radially outward of the dash lines in FIG. 1. Consider that the radius of the rearward end 50 exceeds the radius of the forward end 42 by the distance h. Then the effective differential area is approximately $\pi hD$, where D is the diameter of the sleeve valve at its rear end. This area is preferrably less than the area of the actuating surface 52 to which it is opposed and is desirably equal to approximately one-half that area.

The sleeve valve 32 is in porting relationship with the jet apertures 30. In the position shown in the drawing, the sleeve valve 32 has its porting surface 56 in blocking relationship with the apertures 30. Pressurized water is continuously supplied to the first cavity 24 through a port 58 while pressurized air or some other gas is supplied and contained in the second cavity 26 behind the piston 20. This pressurized air is supplied through a port 60 which may be closed, as by a cock (not shown) when the chamber 26 is charged. Energy is stored in the cylinder 14 by compression of the gas in the chamber 26 behind the piston 20 as the piston moves in the rearward direction in response to the introduction of pressurized water through the inlet port 58. This stored energy is released and the piston moves in the forward direction when the sleeve valve 32 opens the jet apertures 30. A free jet or column of water is ejected through each aperture. This free jet may be referred to as a slug. The valve 32 abruptly terminates the jet after a time duration such that the potential energy which is stored in the cylinder 14 is converted into kinetic energy of the free jet columns in the water surrounding the cylinder. Such jet termination results in the formation of vapor cavities as aforementioned. These vapor cavities which collapse to produce seismic pulses, are shown diagramatically at 62 and 64. The pressure of the water in the cylinder is indicated as $P_S$. The ambient pressure of the water in which the source is submerged is low relative to the pressure $P_S$ and is indicated as return pressure or $P_R$.

The control system for the source 10 includes a three-way, three-position electrohydraulic valve 66 which may be actuated electrically by solenoids, such as the solenoid 68 shown schematically at one end of the valve 66. A control signal generator 70 provides an electrical signal to shift the valve selectively for selected periods of time, governed by the duration of the signal, into different ones of the three positions. In one of these positions, as shown in the drawing, the first control chamber 38 is connected to return pressure $P_R$. The second control chamber 40 is continuously connected to return pressure $P_R$ as by an opening 72 therefrom to the outside of the housing 12 and to the underwater environment in which the source 10 is submerged. The valve 66 has two other positions. In the second position, the first control chamber 38 is closed by the valve 32. In the third position the valve 32 switches the pressure in the first control chamber 38 from return to supply pressure.

The displacement of the valve is illustrated in FIG. 2a. This displacement results from the switching of pressure in the first control chamber 38 as represented in FIG. 2c. FIG. 2b illustrates the acoustic pressure in the far field and shows the seismic pulse which is generated by the source. The switching of the pressures may be accomplished by the control signals which drive the valve from the first position, as shown in FIG. 1 directly to the third position where water at supply pressure $P_S$ flows through an opening 74 into the chamber 38.

Thus, with the valve 66 applying return pressure $P_R$ to the first actuating chamber 38, the supply pressure in the first chamber 24 acts on the differential area 150 of the valve to bias the rearward end 44 of the sleeve valve 32 against the stop 42. The porting surface 56 blocks the jet apertures 30. When a seismic pulse is to be produced the control signal from the generator 30 shifts the valve 66 to its third position and the pressure in the actuating chamber 38 is switched from return to supply pressure $P_S$. The force on the actuating surface 52 in the forward direction exceeds the rearward force on the differential area 150 and the sleeve valve is accelerated forwardly. At a controlled time thereafter, corresponding, for example to the time when the rearward end 44 of the valve 32 is co-incident with the plane containing the axes of the jet apertures 30, where the sleeve valve is at level z about half way through the apertures 30, as shown in FIG. 1, the pressure in the first control chamber 38 is switched back to return pressure. This is shown in FIGS. 2a and 2c by the trailing edge of the wave forms which is approximately co-incident in time with the valve at displacement z. Now the force on the sleeve valve 32 reverses. The sleeve valve 32 decelerates to zero velocity which is reached, for example at the top of its trajectory where the rearward end 44 of the valve 32 fully uncovers the jet apertures 30. This position may, for example, be position w as shown in FIG. 1 and on the trajectory curve of FIG. 2a.

With return pressure $P_R$ in the actuating chamber 38, the force on the differential area of the sleeve valve 32 continues to be applied and begins to accelerate the valve back in the rearward direction toward the stop 42. As the rearward end 44 again reaches position z, the electrohydraulic valve 66 again switches the pressure in the first actuating chamber 38 back to supply pressure. The force, on the valve 32 then reverses and decelerates the valve, enabling it to approach the stop 42 at low velocity such that it reaches the step with zero velocity. Upon reaching the stop, the valve 66 switches the pressure in the chamber 38 back to return pressure to hold the sleeve valve 32 against the stop 42. The control signals may again be applied to repeat the cycle and cause the sleeve valve 32 to again execute its trajectory so as to produce a successive seismic signal pulse.

The water jets are formed during the time indicated in FIG. 2 as the "jet forming duration", while the jet apertures 30 are open. This jet forming duration is long as compared to the duration of the seismic pulse at one half the maximum amplitude thereof, as shown in FIG. 2b. The jet forming duration is such that the water column accelerates to high velocity and converts the potential energy in the cylinder to the kinetic energy of the jet column. Upon termination of the jet, this kinetic energy manifests itself in large vapor cavities which collapse rapidly as shown by the trailing edge of the spike which constitutes the main pressure pulse as shown in FIG. 2b, and produces a seismic signal of high energy and high frequency content.

The jet forming duration may be controlled in accordance with the control signal from the generator 70 in two ways which are shown in FIGS. 3a and 3b. In FIG. 3a, when the valve reaches the top of its trajectory, shown as position w in FIG. 3c, the control signal from the generator 70 causes the valves 66 to be dithered from its first to third position for the jet forming duration. This dithering is illustrated by the castellated portion of FIG. 3a which represents the pressure in the actuating chamber 38. The average pressure in the chamber 38 is then half $P_S$. Inasmuch as the actuating surface of the differential area 150 of the valve 32 can be chosen to be equal to one half the area of the actuating surface 52, the forces on the valve are balanced and the valve remains and is held at position w where the jet forming apertures 30 are open.

FIG. 3b illustrates that the control signal generator can cause the control valves 66 to be set in its middle position when the valve 32 reaches position w. The actuating chamber 38 is then sealed. Due to the incompressability of the water, the valve is not able to move in spite of the force applied to the differential surface 150 thereof. After the jet forming duration expires, the control valve 66 is shifted to the position shown in the drawing and the valve resumes its motion in a rearward direction toward the stop 42.

In a typical case, as illustrated in FIG. 2b, the valve open time, or jet forming duration, may be of the order of 10 milliseconds and the cavity formation and collapse time of the order of 20 milliseconds, with the one-half amplitude pulse duration being of the order of ½ millisecond or less. As the total time duration from control valve opening to the pressure pulse event may be 30 milliseconds or so, the cycle may be repeated to produce pulses without long intervening delays.

Referring next to FIG. 4, there is shown another water gun seismic source having parts similar to the source shown in FIG. 1 and which are labeled with like reference numerals. Like in FIG. 1, the housing 12 has a plurality of jet apertures 30 (in this case four) which extend through the housing into the chamber 24. The apertures 30 intersect a cylindrical cavity 82 in which is disposed a cylindrical sleeve valve 84. The valve is slidable in the cavity in opposite directions from the rearward position shown in the drawing where the jet apertures 30 are closed to a forward position where the jet apertures are also closed. The sleeve is of a length smaller than the length of the cavity 82 and defines actuating chambers 86 and 88. The ends of these chambers may be thinner in the radial direction than the cavity 82, so as to form steps which provide stops for the opposite ends 90 and 92 of the valve 84. Openings 94 and 96 to the outside of the housing 12 provide communication between these chambers 86 and 88 and an electrohydraulic control valve 98. The valve is a two position four-way valve. A control signal generator 100 produces control signals which actuate the valve between its two positions.

The sleeve valve 84 has orifices or openings 102 therein equal in number to the number of jet apertures 30 and which are aligned therewith. The openings may be slots which are longer in the axial direction in which the valve 84 is movable than the jet apertures 30.

In operation, a seismic pulse is produced when the control valve 98 is shifted from the rearward position shown on the drawing to the forward position. This occurs when the pressure in the chamber 88 is switched from supply to return pressure $P_R$, and the pressure in chamber 86 is switched from return to supply pressure $P_S$. The valve 84 then is driven in the forward direction. The slots 102 abruptly open and then close the jet apertures for a duration equal to the desired jet forming duration. The apertures are open for a time equal approximately to the sum of the length of the slot 102 and the length or diameter of the port apertures 30 divided by the velocity of the valve 84. Thus, in the configuration shown, independent control is achieved over the area of the jet forming apertures 30, the duration of the opening of the jet apertures, and the velocity of the valve. Thus, the size of apertures 30 can be set to achieve the desired jet cross-section, the velocity of the valve can be chosen to obtain the desired jet initiation and jet termination rates, and the length of the slot 102 can then be selected to achieve the desired aperture open time.

FIGS. 2f and 2g illustrate the pressures in the actuating cavities 86 and 88 of the source 80 shown in FIG. 4. When the pressure is switched from return to supply in the rearward actuating chamber 86 and from supply to return in the forward actuating chamber 88, the force on the sleeve valve 84 is reversed. The slots 102 cross the jet forming apertures 30 during the jet forming duration as shown in FIGS. 2f and 2g. Then the free jet columns are launched with the duration for optimal energy conversion and pulse amplitude. This duration is as shown in FIG. 2b, long as compared to the half amplitude duration of the seismic pulse. The pressures are not reversed until the next successive seismic pulse is desired. When this occurs the valve 84 is driven in the opposite direction and another free jet column is formed during the jet forming duration. By controlling the fluid flow velocities to the actuating chambers 86 and 88 as with suitable regulating valves (not shown) the jet forming durations may be controlled.

The valve 84 is maintained in its forward position until the next seismic pulse is desired. When in the forward position the slots 102 are in the position shown by the dashed lines in FIG. 4. In this position the jet apertures are also closed.

Referring to FIG. 5 there is shown only one side of a seismic source 104. This source is similar to the source 80 shown in FIG. 4. The source 104 has a cylindrical sleeve valve 106 with slots 108 therein comparable in size to the jet apertures 30. The slots are aligned with the apertures and move into registry therewith so as to open the jet apertures when an electrohydraulic control valve 109 similar to the valve 98 is actuated. To initiate a cycle, the pressures in the rear and forward actuating chambers 86 and 88 are reversed as shown in FIGS. 2d and 2e so as to switch the pressure in the cavity 86 from return to supply pressure while the pressure in the forward actuating cavity 88 is switched from supply to return pressure. The valve 106 is then driven forwardly until it reaches the stop at the forward end of the valve cavity 82. Then the slots 108 are in registry therewith with the jet apertures 30. The apertures may be held open for as long a jet formation duration as desired. When the jet has been formed, the pressures in the chambers 86 and 88 are then switched again and the valve 106 shuttles back to the position shown in FIG. 5 where the jet apertures are closed. The pressures in the actuating cavities 88 and 86 are not switched again until the next pulse is to be produced. If the pressure is switched just when the valve 106 reaches the forward end of its trajectory, the jet duration is minimized as shown in FIGS. 2d and 2e. By delaying the switching time, for example, maintaining the pressure in the cavity 86 at supply $P_S$ while the pressure in the other chamber 88 is at return pressure $P_R$, the jet forming duration may be extended. The delay in switching time is indicated in FIGS. 2d and e by the dashed lines. Accordingly any desired jet forming duration and timing of the pulses produced by the source 104 may readily be obtained.

From the foregoing description it will be apparent that there has been provided improved seismic sources of the water gun type. Variations and modifications of the herein described sources within the scope of the invention will undoubtedly suggest themselves to those skilled in the art. Accordingly the foregoing description should be taken as illustrative and not in a limiting sense.

I claim:

1. A source of seismic pulse signals which injects free liquid columns into an underwater environment to generate vapor cavities, the collapse of which produces the seismic pulses, said source comprising a housing having an internal chamber, means for storing energy due to the force of pressurized liquid in said chamber, at least one jet forming aperture in said housing through which pressurized liquid can be released to form said free liquid column, a valve member disposed in porting relationship with said aperture, and means for moving said valve member to open said aperture to initiate the liquid column and to close said aperture to terminate said liquid column while maintaining said aperture open for a time duration which is long compared to said duration of said seismic pulse at half the maximum amplitude thereof.

2. The invention as defined in claim 1 wherein said valve member is a sleeve valve reciprocally movable between a first position where said aperture is closed and a second position where said aperture is open and means for holding said valve in said second position for said time duration.

3. The invention as defined in claim 1 wherein said valve member is a sleeve valve having an orifice therethrough, said orifice having a length not exceeding the length of said jet aperture in the direction of movement of said valve member, and said valve being reciprocally movable between a first position where said aperture is closed and said orifice and aperture are displaced from each other and a second position where said aperture is open and said orifice and aperture are in registry with each other, and means for holding said valve in said second position for said time duration.

4. The invention as defined in claim 1 wherein said valve member is a sleeve valve having an orifice therethrough, said orifice having a length which is greater than the length of said aperture in the direction of movement of said valve, and means for reciprocally moving said valve between first and second positions where said aperture is closed through a third position where said aperture and orifice are in alignment for said time duration.

5. A seismic signal source for use underwater which comprises a housing having a cylinder, a piston slideably disposed in said cylinder and movable in opposite directions axially thereof, said piston dividing said cylinder into first and second chambers on opposite sides of said piston, said second chamber having a gas trapped therein which is compressed when pressurized water is supplied to said first chamber and moves said piston in one of said opposite directions which decreases the volume of said second chamber, a water jet forming aperture extending through such housing into said first chamber, means for limiting movement of the piston is said other of said opposite directions to a position spaced from said jet aperture, a sleeve valve member in said housing movably disposed in porting relationship with said jet aperture for opening said aperture to release a jet of said pressurized water from said first chamber therethrough and for closing said aperture to terminate said jet to produce the seismic signal by the collapse of a vapor cavity upon termination of said jet, and further a means for actuating said valve member for holding said aperture open for a time duration which is long compared to the duration of said seismic signal at half the maximum amplitude thereof.

6. The invention as defined in claim 5 wherein said sleeve valve is movable axially of said cylinder between first and second positions where said aperture is closed, said valve having an orifice of length in said axial direction longer than the length of said aperture in said axial direction and disposed to move into alignment with said aperture for said time duration while said valve moves between said first and second positions.

7. The invention as defined in claim 5 wherein said valve member is movable in opposite directions axially of said cylinder between first and second positions where said aperture is respectively open and closed, said valve having an orifice therethrough of length not exceeding the length of said aperture in the axial direction and which is disposed in registry with said aperture when said valve is in said first position, and control means for actuating said valve to maintain said valve in said first and second positions for selected periods of time.

8. The invention as defined in claim 5 wherein said sleeve valve member is moveable within said first chamber and has a porting surface near one of its ends of length exceeding the length of said aperture in the direction axially of said cylinder, said valve being axially moveable in opposite directions between a first position where said porting surface is in blocking relationship with said aperture and said aperture is closed and a second position where said porting surface is clear of said aperture and said aperture is open, said valve having a ring portion which defines first and second cavities in said housing and presents first and second opposed areas of different size thereto, the first named end of said valve having an area exposed to said first chamber which is less than the area of the opposing end of said valve in said chamber, the difference between these last two mentioned areas being less than said first area, all areas above mentioned being taken as projections in a plane normal to the axis of valve motion, and means for selectively applying said pressurized water to said first cavity and continuously communicating said second cavity to the ambient water for moving said valve between said first and said second positions.

9. The invention as defined in claim 5 wherein said housing has a plurality of apertures extending into said first chamber which are simultaneously opened and closed by said sleeve valve.

10. The invention as defined in claim 5 wherein said housing has at least one cavity in which said valve is at least partially disposed, said valve having first and second opposed control surfaces which define first and second actuating chambers in said cavity, and electrohydraulic control means for switching the flow of pressurized water into said actuating chambers to displace said valve reciprocally along a trajectory between first and second positions where said aperture is opened and closed.

11. The invention as defined in claim 10 wherein said control means comprises means for switching the pressure in said chambers before said valve reaches said first position along its trajectory and also before said valve reaches said second position along said trajectory to reduce the velocity of said valve substantially to zero velocity when said valve reaches said first and second positions.

12. The invention as defined in claim 10 wherein said control means comprises a control signal generator for providing an electrical signal defining the displacement of said sleeve valve with time, and an electrohydraulic control valve responsive to said control signal for switching the pressure in said actuating cavity in accordance with said electrical signal.

13. The invention as defined in claim 12 wherein said control valve has a position in which said actuating cavity is sealed by said valve such that said valve can be maintained in said first position for selected time durations.

14. The invention as set forth in claim 12 wherein said valve is also partially disposed in said first chamber and has a third actuating surface in said first chamber opposed to said first control surface in said first cavity, said third surface facing in the direction of movement of said valve toward said first position where said aperture is open, means for continuously communicating pressure which is relatively low compared to the relatively high pressure of said pressurized water supplied to said first chamber through said second actuating chamber, and means for repetitively switching the pressure in said first actuating chamber between said low pressure and said high pressure such that the average force on said first surface is equal to the force on said third surface to maintain said valve in said first position for a selected period of time.

* * * * *